United States Patent Office 3,654,286
Patented Apr. 4, 1972

3,654,286
PIPERIDYLIDENE SUBSTITUTED CYCLO-
HEPTA[1,2-b]THIOPHENES
Jean-Michel Bastian, Birsfelden, and Gustav Schwarb,
Allschwil, Switzerland, assignors to Sandoz Ltd. (also
known as Sandoz AG), Basel, Switzerland
No Drawing. Filed Jan. 28, 1970, Ser. No. 6,586
Claims priority, application Switzerland, Feb. 7, 1969,
1,872/69
Int. Cl. C07d 29/36
U.S. Cl. 260—293.57   1 Claim

ABSTRACT OF THE DISCLOSURE

The invention concerns novel compounds of the formula:

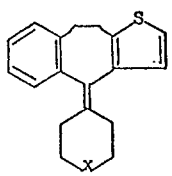

wherein X is

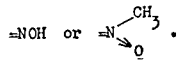

The compounds are antaminics.

IMPROVEMENTS IN OR RELATING TO ORGANIC COMPOUNDS

The present invention relates to new heterocyclic compounds of Formula I,

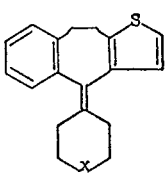

(I)

in which X signifies the

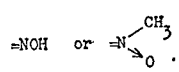

group, as well as processes for their production.

In accordance with the invention a compound of Formula I is obtained by (a) Oxidizing the compounds of Formula IIa

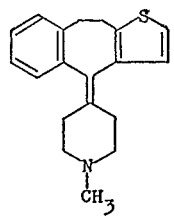

(IIa)

with hydrogen peroxide in an inert solvent to give the compound of Formula Ia,

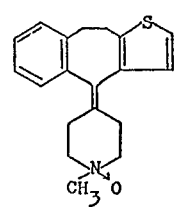

(Ia)

or (b) reacting the compound of Formula IIb

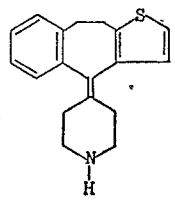

IIb in an inert solvent with an acyl peroxide and saponifying the resulting acyl hydroxyl amine to give the compound of Formula Ib.

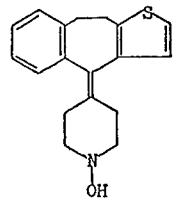

Ib

Oxidation of the compound of Formula IIa may conveniently be effected with an excess of hydrogen peroxide, e.g. up to 3 mols per mol of starting material, 1.3 mols preferably being used. Inert solvents which may be used are liquid alcohols such as ethanol, and the reaction is conveniently effected at an elevated temperature, preferably between 50° and 120° C.

Dibenzoyl peroxide may, for example, be used as acyl peroxide in the process in accordance with embodiment (b), and a di(lower)alkyl amide of a lower aliphatic carboxylic acid, such as dimethyl formamide, may, for example, be used as inert solvent. The subsequent splitting off of the acyl radical may be effected by saponification with an alkali metal hydroxide or an acid.

The process in accordance with embodiment (a) is preferably effected by oxidizing 4-(1-methyl-4-piperidylidene)-9,10 - dihydro-4H-benzo[4,5]cyclohepta[1,2-b]thiophene in ethanol with an approx. 30% excess of 35% hydrogen peroxide at the reflux temperature of the reaction mixture. After the reaction is complete, namely after about 15 to 20 hours, the remaining hydrogen peroxide is destroyed, e.g. by heating the reaction mixture following on the addition of active charcoal.

The process in accordance with embodiment (b) may, for example, be effected by reacting 4-(4-piperidylidene)-9,10 - dihydro-4H-benzo[4,5]cyclohepta[1,2-b]thiophene between about 0° and 5° C. in dimethyl formamide with dibenzoyl peroxide, and subsequently allowing the reaction mixture to stand at room temperature for about 10 to 15 hours. The resulting acyl hydroxy amine can be isolated from the reaction mixture in manner known per se, is optionally purified and saponified, for example with an alcoholic solution of potassium hydroxide, preferably at the boiling temperature of the reaction mixture, and optionally in an inert gas atmosphere, such as nitrogen.

The compounds of Formulae IIa and IIb used as starting materials are known.

The compounds of Formula I are useful because they possess pharmacological activity in animals. More particularly, the compounds are useful antaminics as indicated by standard histamine, serotonine and acetylchlorine toxicty tests with guinea pigs. The term "antaminic" is somewhat wider in scope than only an antihistaminic and means that the compounds, in addition to antihistaminic activity, also have an antagonistic activity against a series of other biogenic amine such as aceytlcholine and serotonine.

For the above-mentioned use, the dosage administered will of course vary depending upon the compound employed, the mode of administration and the treatment desired. However, in general, satisfactory results can be obtained when administered at a daily dosage of from about 0.03 to about 20 mg./kg. animal body weight, conveniently given in divided doses 2 to 3 times a day or in sustained release form. For the larger mammals, the total dosage is in the range of from about 2 to about 10 mg., and a suitable oral dosage form comprises from about 0.7 to about 5 milligrams of the compound admixed with a solid or liquid pharmaceutical carrier or diluent.

The compounds of Formula I or their physiologically tolerable acid addition salts may be used as medicaments on their own or in the form of suitable medicinal preparations with pharmacologically inert adjuvants.

In the following non-limitative examples all temperatures are indicated in degrees centigrade and are uncorrected.

EXAMPLE 1

4-(1-methyl-4-piperidylidene-N-oxide)-9,10-dihydro-4H-benzo[4,5]cyclohepta[1,2-b]thiophene 100 g. of 4-(1-methyl-4-piperidylidene)-9,10-dihydro-4H - benzo[4,5]cyclohepta[1,2 - b]thiophene are boiled under reflux for 18 hours in 100 cc. of absolute ethanol with 42.7 g. of 35% hydrogen peroxide. 5 g. of active charcoal are subsequently added and boiling under reflux is continued for 1 hour in order to destroy the excess hydrogen peroxide. The active charcoal is subsequently filtered off and the solution concentrated in a vacuum. 800 cc. of ethyl acetate are added to the resulting oily residue, and the mixture is boiled for a short time, whereby the product precipitates in crystalline form. The crystals are filtered off at room temperature and again boiled with ethyl acetate. The product which has been recrystallized from acetone is the semihydrate of the title compound, which after drying at 90° in a vacuum for 5 hours has a M.P. of 220–221°.

EXAMPLE 2

4-(1-hydroxy-4-piperidylidene)-9,10-dihydro-4H-benzo[4,5]cyclohepta[1,2-b]thiophene A solution of 8.0 g. of dibenzoyl peroxide in 70 cc. of N,N-dimethyl formamide is added at 0–5° during the course of 15 minutes to a solution of 17 g. of 4-(4-piperidylidene) - 9,10-dihydro-4H-benzo[4,5]cyclohepta[1,2-b]thiophene in 170 cc. of N,N-dimethyl formamide, the solution is stirred at the same temperature for 5 hours, a solution of 4.0 g. of dibenzoyl peroxide in 30 cc. of N,N-dimethyl formamide is added, and the mixture is stirred at 0–5° for a further hour. The reaction mixture is allowed to stand at room temperature for 10 to 15 hours, whereupon it is poured on 1500 cc. of ice water and 1000 cc. of ether, the organic phase is separated and extraction is again effected twice with ether. The combined extracts are washed with water, dried over sodium sulphate and the solvent is evaporated. The residue is dissolved in 200 cc. of acetone, the solution is filtered through active charcoal, 100 cc. of ethanol are added and the acetone is evaporated, whereby 4-(1-benzoyloxy-4 - piperidylidene)-9,10-dihydro-4H-benzo[4,5]cyclohepta[1,2-b]thiophene having a M.P. of 154–156° is obtained.

60 cc. of water are added to a boiling solution of 13.5 g. of 4-(1-benzoyloxy-4-piperidylidene)-9,10-dihydro-4H-benzo[4,5]cyclohepta[1,2 - b]thiophene in 500 cc. of ethanol in an atmosphere of nitrogen, and then 75 cc. of a 2 N potassium hydroxide solution are added during the course of 15 minutes. The mixture is stirred at reflux temperature for 40 minutes and the ethanol is evaporated off at reduced pressure. 300 cc. of water are added to the residue and the mixture is shaken out several times with benzene. The combined benzene solutions are washed with water until neutral, are dried over sodium sulphate and filtered through active charcoal. After concentrating the filtrate at reduced pressure to about 800 cc. the precipitated title compound is filtered off and recrystallized once from benzene or ethanol. M.P. 221–223°.

What is claimed is:
1. 4 - (1 - hydroxy-4-piperidylidene)-9,10-dihydro-4H-benzo[4,5]cyclohepta[1,2-b]thiophene.

References Cited

UNITED STATES PATENTS

| | | | |
|---|---|---|---|
| 2,075,359 | 3/1937 | Salzberg et al. | 424—250 |
| 3,014,911 | 12/1961 | Engelhardt | 260—293.44 |
| 3,272,826 | 9/1966 | Jucker et al. | 260—293.44 |

NORMA S. MILESTONE, Primary Examiner

S. D. WINTERS, Assistant Examiner

U.S. Cl. X.R.

424—267